United States Patent Office 2,721,118
Patented Oct. 18, 1955

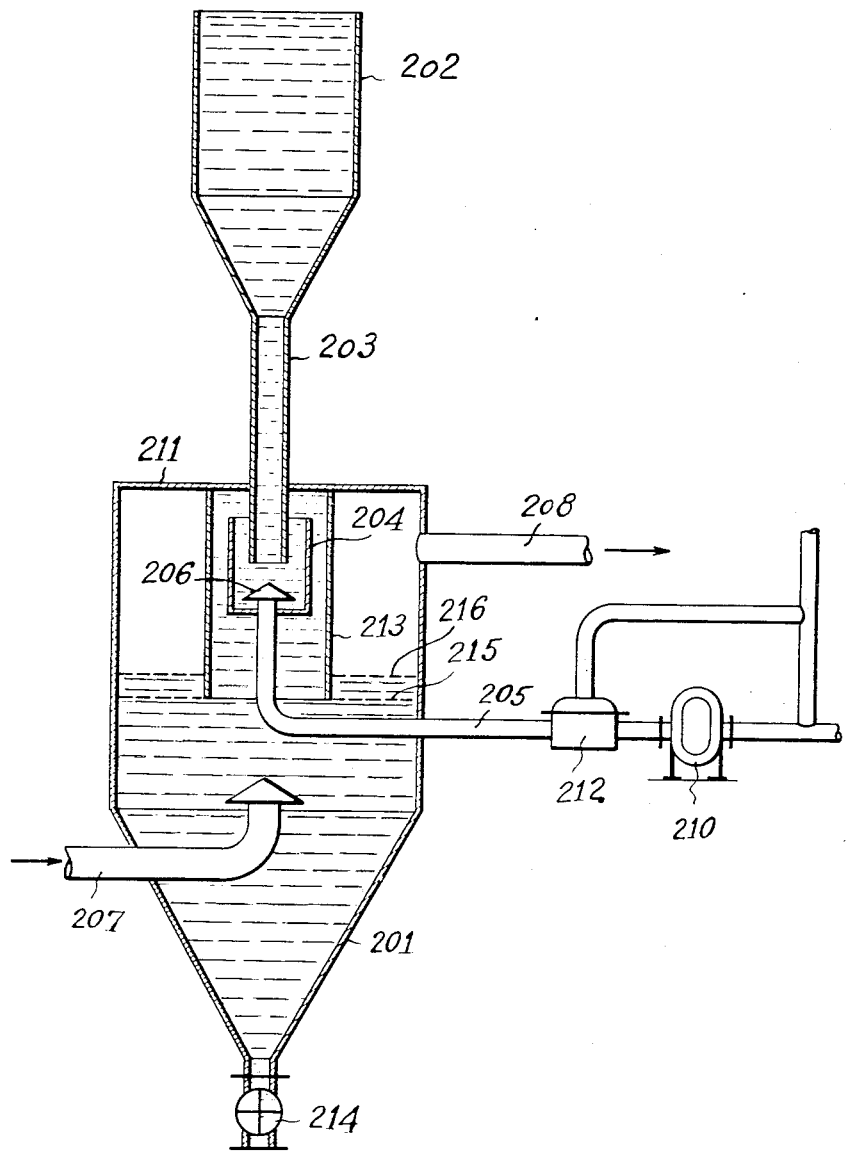

2,721,118

APPARATUS FOR MAINTAINING A CONSTANT FLUIDIZED BED LEVEL

Maurice Roger Marcel Accariés, Bourg-la-Reine, France, assignor to Societe Anonyme dite Compagnie pour la Fabrication des Compteurs et Materiel d'Usines à Gaz, Montrouge, France Application July 1, 1952, Serial No. 296,542

Claims priority, application France July 9, 1951

2 Claims. (Cl. 23—284)

This invention relates to a method for bringing pulverulent or powdered substances into contact with gases with the more particular object of fluidizing said substances.

The processes for bringing pulverulent or powdered substances or materials into contact with gases which are employed at the present time encounter some difficulties, particularly with respect to maintaining a substantially constant level in the tank in which the pulverulent material is agitated or fluidized.

The difficulties encountered in carrying out the contacting technique, such as difficulty in distributing the pulverulent material homogeneously, in ensuring a perfect tightness between the reaction enclosures containing different gases and in ensuring regular deliveries of powder are well known. These difficulties are increased when the contact takes place with semi-fluid substances in which the grain size of the powder is small and the surface thereof large.

The apparatus now in use for bringing pulverulent bodies into contact with gases comprise, as a rule, a contacting tank which is fed, on the one hand, with pulverulent bodies through a duct opening in its upper part and, on the other hand, with gas through a pipe opening in its lower part. The contacting tank is fed with pulverulent substances which are fluidized or agitated owing to the admission of gas.

In such apparatus, in order to maintain a substantially constant level of the fluidized powder in the contacting tank, it is necessary that the amount of powder admitted to the contacting tank be equal to the amount of powder discharged at the bottom of said tank. In most cases, however, it is rather difficult to separately control the admission and discharge of the powder so as to keep them equal and, if the tank has a small diameter in relation to the amount of circulating powder, the variation of the level may take place quickly and cause the loss of pressure to increase in the contacting tank. Such a variation in the loss of pressure has already been utilized for regulating the delivery by causing same to control a device for closing the powder admitting duct and a system for closing the exhaust orifice of the contacting tank, but this requires complicated regulating apparatus.

This invention has for its object to remedy such difficulties, taking advantage of the properties themselves of powders in agitated contact with a gas, that is, of fluidized powders. It consists of an apparatus comprising, in combination, an auxiliary tank in which the powder is semi-fluidized and a tank in which the powder is brought into contact with gases, and wherein the auxiliary tank is disposed to ensure regular feeding, homogeneous distribution of the powder and tightness between the contacting tank and the powder supplying apparatus which may operate under different gases.

This invention has also for its object to provide a powder feeding device which makes it possible to ensure a substantially constant level of fluidized powder in the contacting tank through automatic regulating means including a double walled auxiliary tank.

The invention will now be described in detail, with reference to a particular embodiment given by way of example and illustrated in the attached drawing, wherein:

The single view is a diagrammatic, vertical section of the embodiment of the invention.

Referring to the drawing in detail, it will be seen that the illustrated embodiment of the invention includes a contacting tank 201, and a relatively small tank 204 disposed in the upper portion of tank 201 and into which a feeding duct 203 opens from a container 202 for the pulverulent material or substance disposed above the tank 201.

A cylindrical wall 213 is concentric with and surrounds the small tank 204 and depends from the top wall or lid 211 of tank 201 to a predetermined level within the latter. The gas for semi-fluidizing the pulverulent material within the contacting tank 201 is fed to the latter through a duct 207, and an exhaust duct 208 extends from the upper portion of tank 201 to receive the exhausted gas from the latter and from which the gas can be recovered. A gate or discharge valve 214 is provided at the bottom of contacting tank 201 for discharging the pulverulent material following contact of the latter with the gas.

A pipe 205 through which circulates an auxiliary gas extends upwardly into tank 204 in axial alignment with duct 203. The pipe 205 is capped with a conical cover 206 to effect distribution of the auxiliary gas downward and radially outward in the tank 204. The auxiliary gas is delivered to pipe 205 by a compressor 210 provided with a pressure regulator 212 from which a bypass extends. When the compressor 210 is started, the powder is drawn from duct 203 by the auxiliary gas issuing from the capped end of pipe 205 and gradually fills the tank 204 in which it is kept agitated or in a semi-fluidized state. As the powder expands at the top of tank 204, it flows into the annular space between tank 204 and wall 213 and falls down onto the layer of fluidized powder existing in the tank 201, the auxiliary gas escaping along with the principal gas introduced into contacting tank 201, through the gas exhaust pipe 208.

The delivery of powder from the auxiliary 204 into the contacting tank 201 during the exhaust of gas from pipe 205 is calculated so that the delivery through 204 is higher than the exhaust through the gate 214 and the level of the powder in the tank 201 therefore tends to rise and pass from the level 215 to the level 216 for instance. Since the fluidized powder acts like a liquid, the auxiliary gas issuing from pipe 205 has therefore to overcome the resistance of the layer of fluidized powder contained in the tank 204 and of the layer between 215 and 216.

The pressure opposing the flow of gas from the auxiliary gas circuit increases as a function of the total height of the powder and of the initial pressure $p$ for the level 215 so that such opposing pressure will be $p1$ for the level 216. If the pressure regulator 212 is regulated for the pressure $p$ the flow from pipe 205 of the gas circuit will be interrupted when the pressure is $p1$, that is, when the level of fluidized powder in tank 201 reaches the level 216 and the powder feeding is then interrupted; the level tends to lower in the tank 201 to 215; the pressure opposing gas flow from the auxiliary circuit decreases, the auxiliary gas delivery is restored, and the powder feeding is thereby resumed.

The variation of level from 216 to 215 then depends on the sensitivity of the regulator 212; as a rule, it has been ascertained that the level variation could easily be reduced to 10 cm. or less.

The auxiliary gas will be preferably taken from the outlet pipe of the gas reacting in the tank fed, the exhaust being either an air exhaust or a suction return exhaust, according to the kind of the gas.

The depth of the auxiliary tank, and therefore the pressure opposing the flow of auxiliary gas, is determined according to the requirements as a function of the overpressure that can be allowed at the bottom of the feeding pipe, of the fineness of the powder and of the rate of flow of the auxiliary gas during the operation.

The regulator 212 associated with the compressor may be replaced by a ventilator the back-flow pressure and delivery of which are adjusted to the requirements under consideration. The system offers wide adaptability to various operating conditions since the level in the reaction tank may vary as a function of the regulator pressure.

Although a particular embodiment of the invention has been described in detail, it is apparent that various modifications thereof are possible without departing from the invention; for example, the shapes of the auxiliary tank 204 and of the distribution double wall 213 may be different, either cylindrical or parallelepipedic, or semicylindrical, or frusto-conical, or conical; the auxiliary gas may be the same as the principal or reaction gas, or any other gas whether reacting or not with the principal gas; the auxiliary gas may even be an additional gas intended for further reactions; the auxiliary gas distribution system may be of any type.

Other and further modifications and changes may be effected in the described embodiment of the invention without departing from the scope or spirit of the invention, except as indicated in the appended claims.

What I claim is:

1. Apparatus for bringing a powdered material into contact with a gas comprising a contacting tank, an upwardly opening auxiliary tank within said contacting tank, a continuous wall extending downwardly from the top of said contacting tank around said auxiliary tank to define a downwardly opening space around the latter, a downwardly opening duct for feeding a powdered material into said auxiliary tank from above, means feeding auxiliary gas at a predetermined pressure to said auxiliary tank at the bottom of the latter below the downwardly opening end of said duct to fluidize the powdered material fed from the latter, means feeding a main supply of gas to said contacting tank, means for exhausting gas from the top of said contacting tank, and means for discharging powdered material from the bottom of said contacting tank at a rate less than the rate at which powdered material is discharged from said feeding duct and fluidized by the auxiliary gas so that the level of fluidized powdered material tends to rise in said contacting tank until the pressure head of the fluidized powdered material in said contacting and auxiliary tanks exceeds said predetermined pressure of the auxiliary gas to stop the feeding of the latter to said auxiliary tank whereupon the feeding of powdered material is deterred and the level thereof in said contacting tank recedes to again permit the feeding of auxiliary gas and the consequent feeding of powdered material.

2. Apparatus according to claim 1; wherein said means feeding auxiliary gas at a predetermined pressure includes an auxiliary gas feeding pipe opening into said auxiliary tank at the bottom of the latter, pumping means for effecting the flow of an auxiliary gas through said pipe, and pressure regulating means in said pipe between said pumping means and the end of said pipe opening into said auxiliary tank.

References Cited in the file of this patent

UNITED STATES PATENTS 2,472,427    Johnson _____ June 7, 1949